(12) United States Patent
Tobias et al.

(10) Patent No.: US 11,640,757 B1
(45) Date of Patent: May 2, 2023

(54) ALERT SYSTEM

(71) Applicants: Marc Tobias, Pittsburgh, PA (US); Tobias Bluzmanis, Miramar, FL (US)

(72) Inventors: Marc Tobias, Pittsburgh, PA (US); Tobias Bluzmanis, Miramar, FL (US)

(*) Notice: Subject to any disclaimer, the term of this patent is extended or adjusted under 35 U.S.C. 154(b) by 0 days.

(21) Appl. No.: 17/972,978

(22) Filed: Oct. 25, 2022

Related U.S. Application Data

(63) Continuation-in-part of application No. 17/743,139, filed on May 12, 2022, now Pat. No. 11,615,690, which is a continuation-in-part of application No. 17/585,688, filed on Jan. 27, 2022, now Pat. No. 11,357,212.

(60) Provisional application No. 63/238,286, filed on Aug. 30, 2021.

(51) Int. Cl.
G08B 21/18 (2006.01)
A01K 27/00 (2006.01)
A01K 29/00 (2006.01)

(52) U.S. Cl.
CPC ............ G08B 21/18 (2013.01); A01K 27/009 (2013.01); A01K 29/005 (2013.01)

(58) Field of Classification Search
CPC ...... A01K 1/0017; A01K 1/033; A01K 1/034; A01K 1/035; A01K 11/006; A01K 27/009; A01K 15/02; A01K 31/02; A01K 1/03; A01K 15/023; G08B 21/22; G08B 21/182; G08B 15/00

USPC .............. 119/721, 484, 719, 712, 720, 163; 340/573.3

See application file for complete search history.

(56) References Cited

U.S. PATENT DOCUMENTS

| | | | |
|---|---|---|---|
| 5,177,900 A * | 1/1993 | Solowiej | E05F 15/77 49/363 |
| 5,475,369 A | 12/1995 | Baker | |
| 5,872,516 A * | 2/1999 | Bonge, Jr. | A01K 15/023 340/552 |
| 5,952,926 A | 9/1999 | Syverson | |
| 6,433,692 B1 | 8/2002 | Kenum | |
| 6,944,990 B2 | 9/2005 | Noyes | |
| 7,458,336 B2 * | 12/2008 | Eu | A01K 1/033 119/51.01 |
| 7,511,626 B2 * | 3/2009 | Siegmann | B66B 1/468 119/843 |

(Continued)

Primary Examiner — Yvonne R Abbott-Lewis
(74) Attorney, Agent, or Firm — Jeffrey A. Proehl; Woods, Fuller, Shultz & Smith, PC

(57) ABSTRACT

A system for notifying occupants of a structure that a pet is proximate to an opening of a structure. The system may include a pet unit wearable on the pet's body and including a transmitter configured to transmit a wireless proximity signal from the pet unit. The system may further include an exit unit positionable at an exit of the structure. The exit unit may include a receiver configured to receive a said wireless proximity signal transmitted by a pet unit, with the receiver being configured to produce an alert signal when a said wireless proximity signal is received. The exit unit may also include an alerting assembly configured to provide a presence alert when the receiver receives a said wireless proximity signal. The alerting assembly may comprise a perceptible alerting mechanism configured to produce a perceptible presence alert which is perceptible to a sense of a human.

19 Claims, 6 Drawing Sheets

(56) References Cited

U.S. PATENT DOCUMENTS

| | | | |
|---|---|---|---|
| 8,854,215 B1 * | 10/2014 | Ellis | E06B 7/32 340/573.3 |
| 9,007,218 B2 * | 4/2015 | Chamberlain | A01K 11/006 340/573.3 |
| 9,157,269 B2 * | 10/2015 | Brown | E06B 7/32 |
| 9,641,620 B2 * | 5/2017 | Sweeney | H04L 12/2803 |
| 10,920,484 B2 * | 2/2021 | Miller | E05F 15/611 |
| 11,044,889 B1 * | 6/2021 | Rogers | A01K 11/008 |
| 11,357,212 B1 * | 6/2022 | Tobias | A01K 15/023 |
| 2005/0161000 A1 | 7/2005 | Noyes | |
| 2005/0284402 A1 | 12/2005 | Becker | |
| 2006/0180094 A1 | 8/2006 | Viggiano | |
| 2008/0072843 A1 * | 3/2008 | Malacarne | E06B 7/32 119/719 |
| 2008/0184940 A1 | 8/2008 | Bosserdet | |
| 2009/0044760 A1 * | 2/2009 | Kodat | A01K 15/02 340/572.1 |
| 2010/0116219 A1 * | 5/2010 | Noyes | E06B 7/32 49/70 |
| 2010/0242854 A1 | 9/2010 | Seger | |

* cited by examiner

ALERT SYSTEM

REFERENCE TO RELATED APPLICATIONS

This application is a continuation-in-part of U.S. non-provisional patent application Ser. No. 17/743,139, filed May 12, 2022, pending, which is a continuation-in-part application of U.S. non-provisional patent application Ser. No. 17/585,688, filed Jan. 27, 2022 and issued as U.S. Pat. No. 11,357,212 on Jun. 14, 2022, which claims the priority benefit of U.S. Provisional Patent No. 63/238,286, filed Aug. 30, 2021, the disclosures of all of which are hereby incorporated by reference in their entireties.

BACKGROUND

Field

The present disclosure relates to pet monitoring systems and more particularly pertains to a new alert system for alerting a user of the proximity of a being or person to an object.

Description of the Prior Art

It is often desirable to be alerted to the presence or proximity of someone or something to an object, such as by the production of an alert that may be sensed by a human, when the presence or proximity occurs. As an example, pets often need to leave the inner confines of a house for various purposes, including exercise and to relieve themselves. Such excursions inevitably lead to the pet needing to pass through a door of the house, and requires that the pet owner recognize that the pet is waiting at (or approaching) a door of the house for exit. Pet owners have recognized that it is not always easy to recognize when their pets are waiting at the door to leave the house. Some dogs may bark, but the owner must be close enough to the door to hear the bark, while other dogs may not bark at all. Other situations involving pets may include movement of the pet into proximity of a feeding or watering bowl, or movement of the pet into proximity to an area that may be dangerous to the pet or the pet is otherwise restricted from moving into.

The desirability of producing an alert when the presence or proximity of a person, or something associated with the person, to an object may extend to other circumstances as well. For example, it may be desirable to be alerted to movement of a person with temporary or permanent physical impairments into proximity of a door of a building, movement of a child into proximity of an area that may be dangerous.

Various devices have been proposed and implemented that sense motion near a door and sound an alarm, however, typically the sensor of such devices has a field of view that is too wide and/or deep for this particular usage, and may produce false alarms which may lead to the pet owner ignoring of the alarm.

SUMMARY

In one aspect, the present disclosure relates to a system for notifying occupants of a structure that a pet is proximate to an exit of the structure. The system may comprise a pet unit that is wearable on the body of the pet and may include a transmitter configured to transmit a wireless proximity signal from the pet unit. The system may further include an exit unit positionable at the exit of the structure. The exit unit may include a receiver configured to receive a said wireless proximity signal transmitted by a said pet unit, with the receiver being configured to produce an alert signal when a said wireless proximity signal is received. The exit unit may further include an alerting assembly configured to provide a presence alert when the receiver receives a said wireless proximity signal. The alerting assembly may comprise a perceptible alerting mechanism configured to produce a perceptible presence alert which is perceptible to a sense of a human.

In another aspect, the disclosure relates to a system for notifying occupants of a structure that a pet is proximate to an exit of the structure. The system may comprise an exit unit positionable at the exit of the structure. The exit unit may include an emitter configured to emit radiation outwardly from the exit unit, and the emitter being configured to emit the radiation from the exit unit in free air. The exit unit may also comprise a detector configured to receive a reflection of the radiation emission of the emitter, and the detector may be configured to produce an alert signal when a said reflection is detected. The exit unit may further comprise an alerting assembly configured to provide a presence alert when the detector detects a reflection, and the alerting assembly may comprise a perceptible alerting mechanism configured to produce a perceptible presence alert which is perceptible to a sense of a human. The system may further include a pet unit wearable on the body of the pet, and the pet unit may include a reflector element configured to reflect radiation emitted from the emitter when the radiation reaches the reflector element.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In still another aspect, the disclosure relates to a system for providing an alert that a being is proximate to an object. The system may comprise a wearable unit wearable on the body of the being, and the wearable unit may include a transmitter configured to transmit a wireless proximity signal from the wearable unit. The system may further include an object unit positionable at the object, and the object unit may include a receiver configured to receive a said wireless proximity signal transmitted by a said wearable unit. The receiver may be configured to produce an alert signal when a said wireless proximity signal is received. The object unit may also have an alerting assembly configured to provide a presence alert when the receiver receives a said wireless proximity signal. The alerting assembly may comprise a perceptible alerting mechanism configured to produce a perceptible presence alert which is perceptible to a sense of a human.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
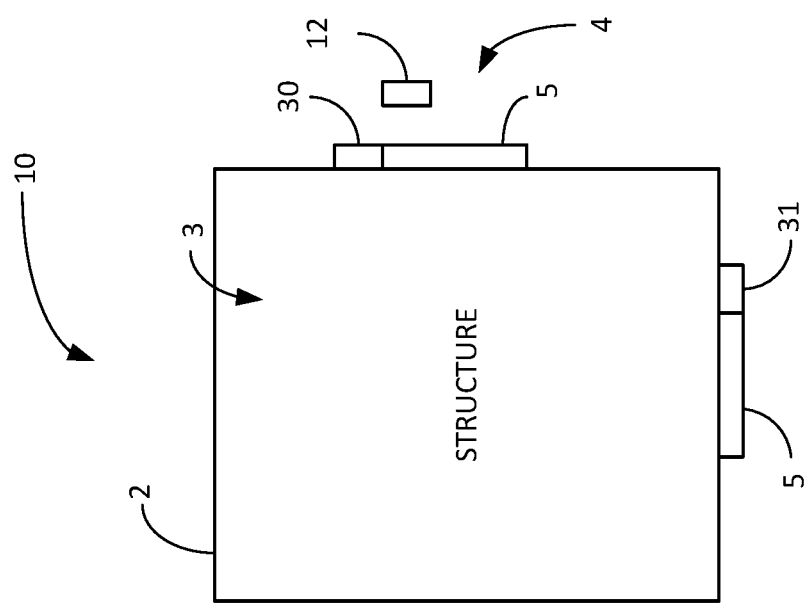
FIG. 1 is a schematic diagram of elements of a new pet door alert system according to the present disclosure.
Figure 2:
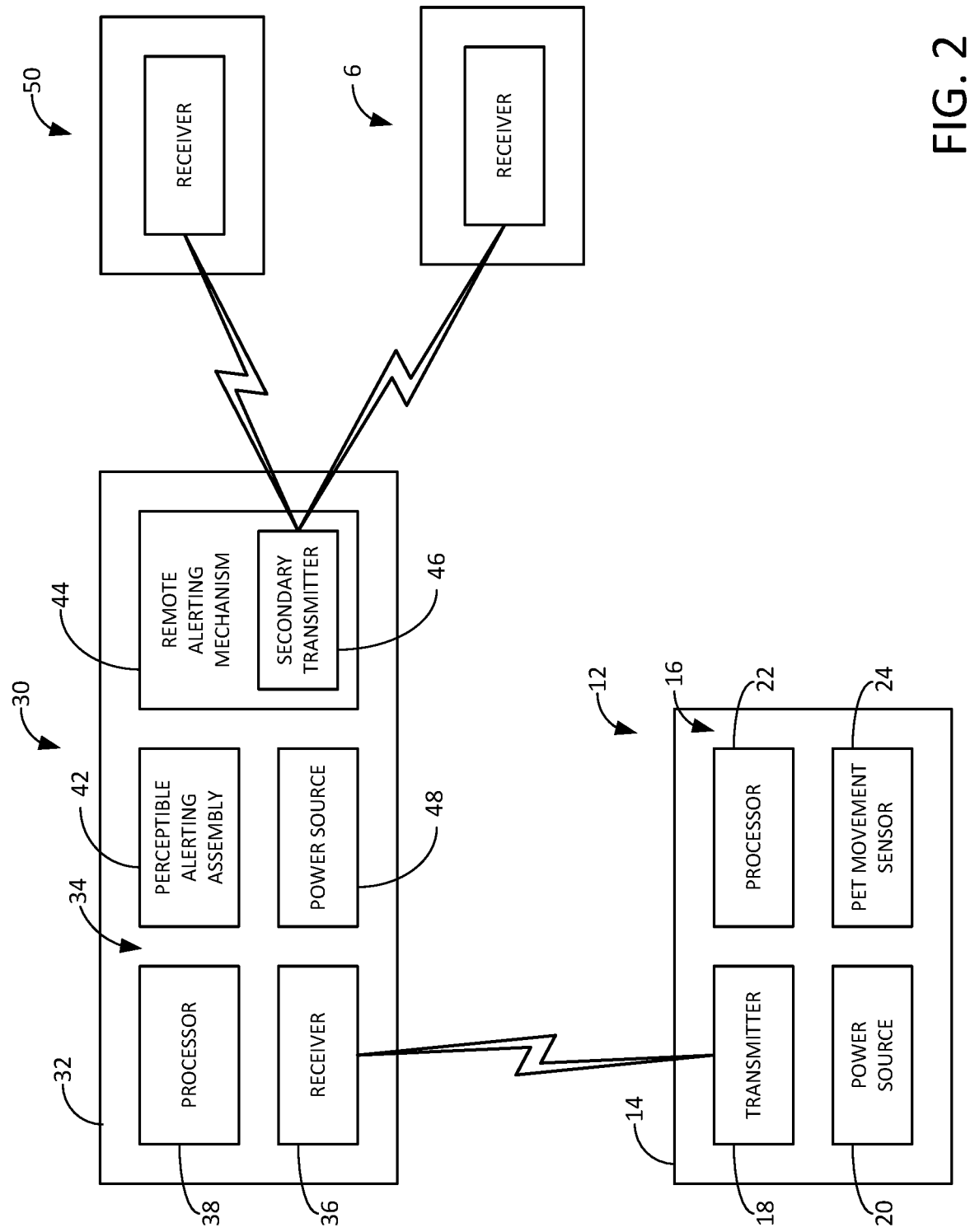
FIG. 2 is a schematic diagram of some of the elements of the pet door alert system shown in greater detail, according to an illustrative embodiment.

With reference now to the drawings, and in particular to FIGS. 1 through 6 thereof, a new pet door alert system embodying the principles and concepts of the disclosed subject matter will be described.

In some aspects, the disclosure relates to a system 10 for notifying a person of persons that a pet is desirous of exit from a structure 2, such as when the pet approaches a door of the structure with the intention of exiting the structure, typically so that the door may be opened to permit the pet to exit the structure. Additionally, the system 10 may be useful for situations where the pet desires to enter the structure after spending time outdoors. The person notified by the system 10 may be an occupant of the structure 2, but in some implementations the person or persons may be remote from the exit of the structure, and even the structure itself. The structure 2 may comprise a building, such as a residential home, and may define an interior 3 and an exterior 4 outside of the building, and have an exit 5 between the exterior and the interior. The exit 5 may comprise an opening between the interior and exterior, and a closure device configured to selectively close the opening of the exit, such as a door with an open condition characterized by the closure device permitting passage of the pet through the opening of the exit, and a closed condition characterized by the closure device preventing passage of the pet through the opening of the exit.

In general, the system 10 may include a pet unit 12 movable with the pet and one or more exit units 30 with each unit 30 being associated with a location on the structure 2 such as an exit 5 of the structure. The exit unit or units may be positioned on the interior of the structure for sensing the approach of a pet to the exit on the interior side of the exit for the purpose of leaving the interior, and/or may be positioned on the exterior of the structure for sensing the approach of a pet to the exit (or entrance) on the exterior side of the exit for the purpose of entering the interior. Movement of the pet unit 12 into proximity of an exit unit 30 may cause the exit unit to produce a local and/or remote alert of the pet's proximity to the unit 30 and, often, an exit of the structure.

In greater detail, the pet unit 12 may be in a form and size that is readily carriable or wearable or otherwise positionable on the body of the pet. In some embodiments, the pet unit 12 may be mountable on a pet collar, such as by means of a clip that removably receives a portion of the collar, or in some embodiments, may be more permanently integrated into a pet collar such that the unit is not removable from the collar. The pet unit 12 may comprise a case 14 for enclosing elements of the unit 12, and the case may have an interior 16 for receiving the elements. The case 14 may also include means for mounting the pet unit on a pet collar, such as, for example, a clip or a loop, and may include a single element or multiple elements.

The pet unit 12 may also include a transmitter 18 which is configured to transmit a wireless proximity signal in an area about the case 14, and thus in an area about a pet wearing the pet unit. The range of the transmission of the proximity signal may be limited in effective signal strength. In some embodiments, the range may be limited to an area with a diameter of less than approximately 10 feet, and may be less than approximately 5 feet, or even less than approximately 3 feet, so as to permit the system to more accurately identify the exit unit to which the pet unit is proximate. In some of the most highly preferred implementations of the system 10, the transmission of the wireless proximity signal may be in the form of an infrared (IR) signal, which is highly suitable for providing a proximity signal with controlled or limited range which reduces the opportunity for "false" alarms by the system 10. Other transmission forms, such as radiofrequency (RF) signals may be less controllable in range and also may be more susceptible to signal interference, which may increase the possibility of false alarms and may also decrease the ability to receive the proximity signal for producing legitimate alarms. The transmitter 18 may be mounted on the case 14, and may be protectively positioned in the interior 16 of the case.

The pet unit 12 may further include a power source 20 which is configured to provide power to elements of the pet unit 12, such as the transmitter 18. The power source 20 may be positioned on the case 14, and may be protectively positioned in the interior 16 of the case. In some embodiments, the power source 20 may comprise a rechargeable battery or a replaceable battery that may be interchangeably mounted on the case interior 16.

The pet unit 12 may still further include a processor 22 which may be mounted on the case 14, and may be positioned in the case interior 16. The processor 22 may be configured to cause the transmitter 18 to transmit the proximity signal. The processor 22 may be configured to cause the transmitter to transmit the proximity signal at a selected interval in between transmissions to minimize the power expended by the transmitter of the pet unit to produce the proximity signal. Illustratively, the selected interval may be preselected, and/or may be selectable by a user of the system 1 to optimize the relative promptness with which the presence of the pet unit to the exit unit is detectable. In some implementations, the processor 22 may be configured to cause the transmitter 18 to transmit the proximity signal with a pet identification code assigned to the pet unit associated with the transmitter for the purpose of identifying the pet unit (and the pet wearing the pet unit) transmitting the proximity signal. Each of the pet units 12 of the system may thus be assigned a pet identification code which is unique in the system.

In some embodiments of the pet unit 12, a pet movement sensor 24 may be included to detect movement of the pet associated with the pet unit. The pet movement sensor 24 may be mounted on the case 14, such as in the case interior 16. The pet movement sensor 24 may be configured to generate a movement signal when movement of the pet unit 12 is sensed, and the pet movement sensor may provide the movement signal to the processor 22, such as an input for the processor to use to determine if the proximity signal should be transmitted at a particular time such as when the per is determined to be moving. Illustratively, the pet movement sensor 24 may comprise an accelerometer, although other device capable of detecting motion may also be utilized.

The exit unit 30 of the system 10 may be positionable at or adjacent to an exit 5 of the building, and optionally the system 10 may include a plurality of exit units 30, 31 with each unit being positionable at a unique one of the exits of the building. Each exit unit 30 may comprise a housing 32, and the housing may define a housing interior 34 for receiving elements of the exit unit. The housing 32 may be configured to be mounted on the structure adjacent to an exit, and the housing may have means for mounting the housing of the exit unit on a building such as, for example, with fasteners or adhesive components.

Each exit unit 30, 31 may also include a receiver 36 which is configured to receive a wireless proximity signal transmitted by a pet unit 12. The receiver 36 may be configured to produce an alert signal when a proximity signal has been received. Illustratively, the receiver 36 may be configured to receive an IR proximity signal transmitted by the transmitter 18 of the pet unit 12. The receiver 36 may also be configured to receive, and in some implementations derive, the pet identification code from a proximity signal received by the receiver. Each exit unit 30, 31 may also include a processor 38 configured to receive the pet identification code associated with the proximity signal received by the receiver to identify the pet unit, and the processor may also receive from the receiver notification of the receipt of the proximity signal by the receiver 36, and may produce the alert signal. The processor 38 may be configured to compare the pet identification code received by the receiver 36 with a list of identified pet identification codes to identify the particular pet unit transmitting the proximity signal. Storage may be associated with the processor 38 to retain the pet identification codes and associated information such that the identification information may be provided to a user via the alerting assembly 40 described herein. The processor 38 may also be configured to log temporal information associated with the received proximity signal, such as, for example, a time and date of reception of the proximity signal, as well as other information such as the pet identification code.

Each exit unit 30, 31 may further comprise an alerting assembly 40 that is configured to provide a presence alert when the receiver 38 receives a wireless proximity signal, and in some implementations the presence alert may also identify the particular exit unit producing the proximity alert. The presence alert provided by the alerting assembly 40 may also include an exit identification code to identify the particular exit unit with which the presence alert is associated, such as which exit unit received the proximity signal. Each of the exit units 30, 31 of the system 10 may have a unique exit identification code.

The alerting assembly 40 may comprise a perceptible alerting mechanism 42 which may be configured to produce a presence alert which is a perceptible presence alert which is perceptible to a sense of a human. For example, the perceptible alerting mechanism 42 may be configured to produce a presence alert which is auditory so as to be able to be sensed by ears of a human. In another example, the perceptible alerting mechanism 42 may be configured to produce a presence alert which is visual so as to be able to be sensed by eyes of a human. In yet another example, the perceptible alerting mechanism 42 may be configured to produce a presence alert which is tactile so as to be able to be sensed by the skin of a human.

The alerting assembly may comprise a remote alerting mechanism 44 which may be configured to produce a remote presence alert signal which is receivable remotely from the exit unit 30. The remote alerting mechanism 44 may wirelessly transmit the remote presence alert signal using any suitable communication protocol and technology, and may transmit using, for example, the Bluetooth low energy (BLE) protocol. In some implementations, the remote presence alert signal transmitted by the alerting mechanism may be configured to be received by an information handling device 6. The information handling device 6 may be configured to provide the remote alert signal to an application program resident on the information handling device, via communications circuitry typically provided on a device, such as a radio receiver capable of receiving BLE signals. The information handling device 6 may include a so-called "smart" cellular telephone with processing capabilities in addition to communication capabilities, or a desktop or laptop portable computer with suitable communication circuitry. In some embodiments, the remote alerting mechanism 44 may include a secondary transmitter 46 that is configured to transmit the remote presence alert signal and may also be configured to transmit the exit identification code for the exit unit 30 with the remote presence alert signal.

The exit unit 30 may also include a power source 48 configured to provide power to elements of the exit unit. The power source 48 may be positioned on the housing 32 and may comprise a battery, such as a rechargeable battery, but may also comprise a power cord configured to interface with an electrical power outlet of the structural wiring of the building.

In some embodiments, the system 10 may also include a remote unit 50 which is configured to provide a perceptible remote alert at a location that is remote from the exit unit receiving a proximity signal. For example, the exit unit 30 may be positioned on the exterior of the building adjacent to the exit opening, or in the building interior adjacent to the exit, which may not be the most effective location for providing a broad range or reach for sensing the perceptible presence alert. The remote unit 50 may have similar elements to the exit unit 30 so that the remote unit is able to emulate some functions of the exit unit. For example, the remote unit 50 may include a remote housing freely positionable with respect to the exit unit 30, a remote receiver for receiving the remote presence alert signal produced by the remote alerting mechanism 44 of the exit unit, a remote alerting assembly configured to provide a perceptible alert in the space about the remote housing, and a remote power supply configured to provide power to elements of the remote unit. Additional elements may also be provided, such as, for example, a remote processor.

Figure 3:
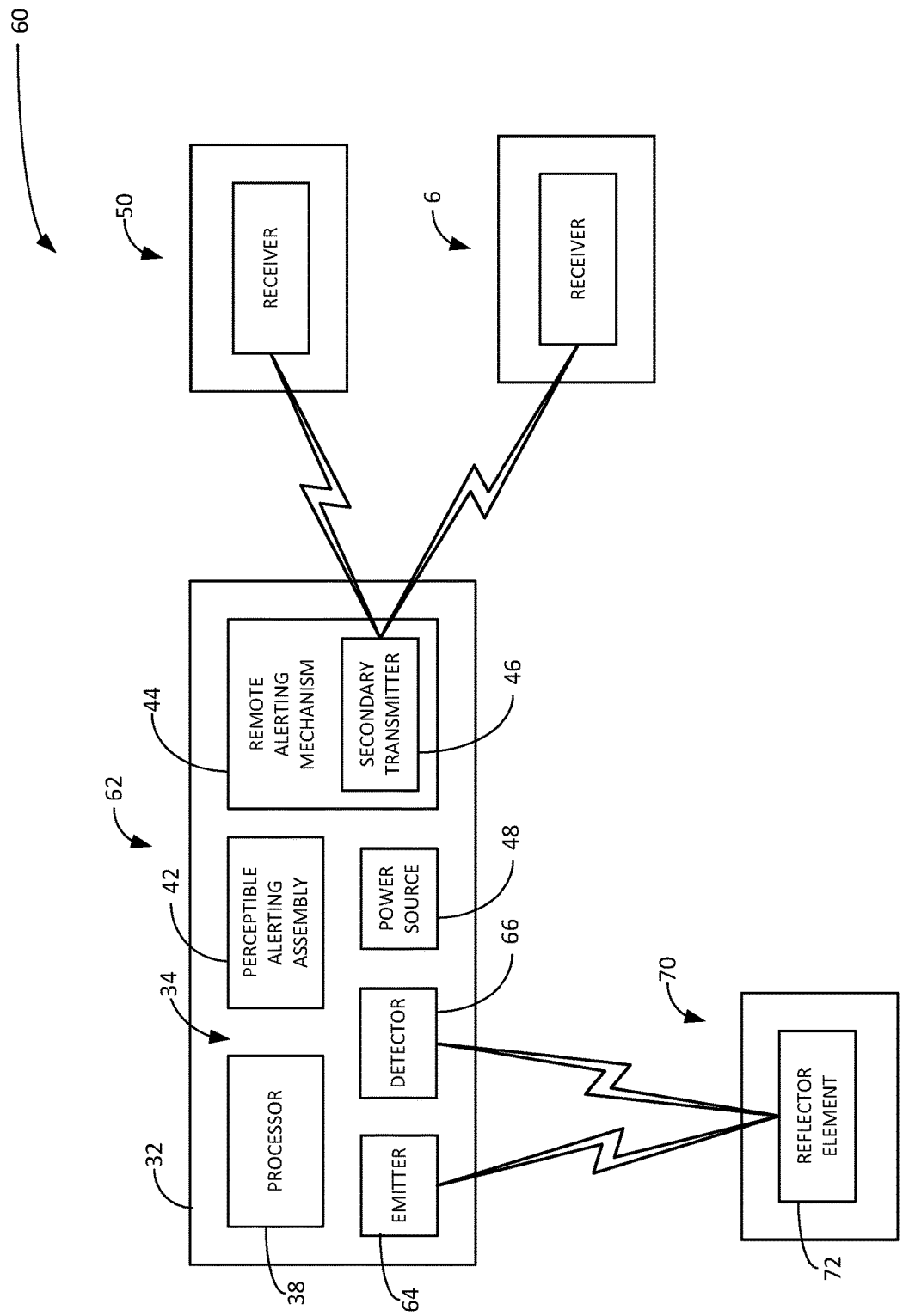
FIG. 3 is a schematic diagram of element of another illustrative embodiment of the pet door alert system.

In another illustrative embodiment 60, such as is depicted in FIG. 3, an exit unit 62 of the embodiment may include an emitter 64 that is configured to emit radiation outwardly from the exit unit, and may emit the radiation from the exit unit in free air. The emitter 64 may be mounted on the housing of the exit unit. In some of the most preferred embodiments, the emitter 64 may be configured to emit infrared (IR) radiation, and the IR emitter may be configured to emit IR radiation having a wavelength of approximately 940 nm, although other suitable IR wavelengths may be utilized. The exit unit 62 may also include a detector 66 which is configured to receive and detect a reflection of the radiation emitted by the emitter. The detector 66 may be mounted on the housing of the exit unit, and upon detection of reflected radiation, the detector may be configured to produce an alert signal. In some embodiments, the detector 66 may be configured to detect a reflection of the radiation emission which has reflected off an object within a specific distance or proximity to the exit unit.

The embodiment 60 may also include a pet unit 70 to be associated with the pet, and the pet unit may have a reflector element 72 which may be configured to reflect radiation emitted from the emitter 64 when the radiation reaches the reflector element, so that a portion of the reflected radiation may be detected by the detector 66. The reflector element 72 may have a reflective surface which may be reflective to the radiation emitted by the emitter, so that waves of the emitter radiation striking the reflective surface may be reflected outwardly from the surface and, to some degree, back toward the exit unit and the detector. The reflective surface may be formed on a surface associated, or associable, with a pet, such as an item easily worn by the pet. In some implementations, the reflective surface may be formed on a pet collar, and illustratively the reflective surface is formed on a length of tape, with the reflective surface forming one side of the tape, and the tape may be attached to the pet collar (or other pet accoutrement) by any suitable technique, such as by adhering using adhesive. Other elements of the system 10 described herein may also be utilized in the embodiment 60 as is suitable and desirable. Those skilled in the art, having the benefit of this disclosure, will recognize that the system 10 may also be used for recognizing the need for the pet to reenter the structure through the door, and the system 10 may be adapted by simply positioning the exit unit on the exterior of the structure adjacent the exit opening in the building so as to sense a pet proximate to the exterior side of the door.

Figure 4:
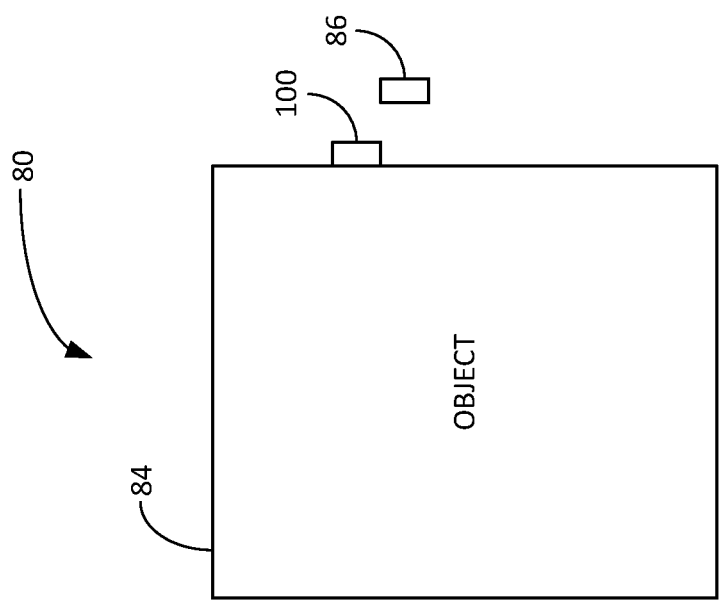
FIG. 4 is a schematic diagram of elements of another implementation of the disclosure for a new alert system.
Figure 5:
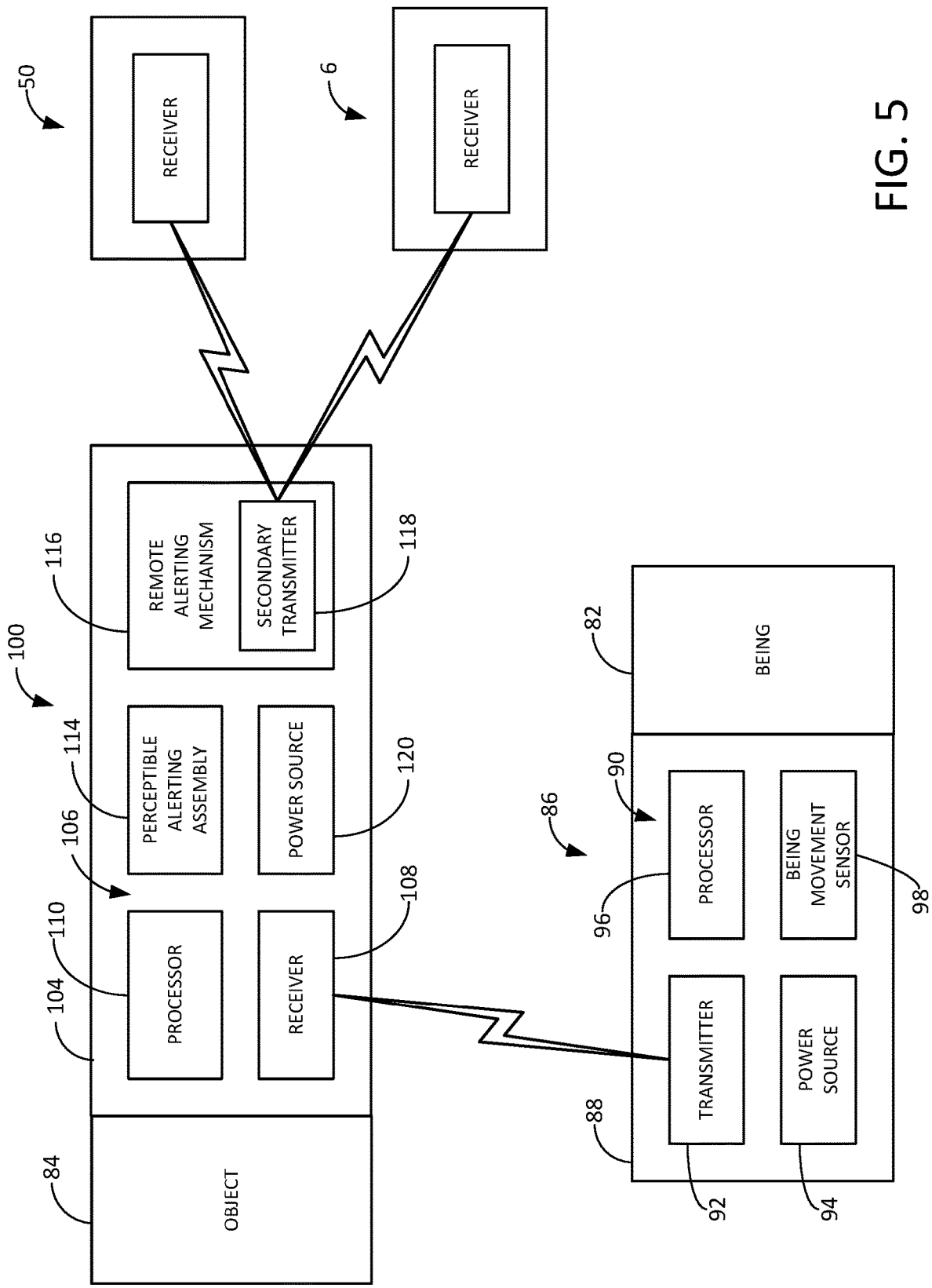
FIG. 5 is a schematic diagram of some of the elements of the alert system of FIG. 4 shown in greater detail, according to an illustrative embodiment.

In other embodiments of the disclosure, such as are illustratively shown in FIGS. 4 and 5, a system 80 for providing an alert of movement of a being 82 into proximity of an object 84 is provided. In exemplary implementations, the being 82 may be a person who may or may not have physical impairments, or a companion animal such as a dog. The being 82 may be relatively mobile or movable while the object 84 may be relatively stationary. In further exemplary implementations, the object 84 may be, or may be associated with, a portion or area of the structure or building or an opening into a structure, or an object such as a bull from which a pet drinks or feeds.

The system 80 may include a wearable unit 86 which is wearable or otherwise carriable on the body of the being 82. The wearable unit 86 may have a size configured for wearing on a part or a portion of the body of the being 82. In some embodiments, the wearable unit 86 may be associated with something carried on the body or in close association with the body of the being 82, such as a wheelchair, a walker, or a cane, In greater detail, the wearable unit 86 may include a case 88 with an interior 90, and the case may have structure facilitating or permitting the mounting of the case of the wearable unit on the part of the body. The structure may comprise, for example, a clip suitable to clip onto or engage in a secure manner a portion of the clothing worn by the being, or hook and loop fastening tape, or other suitable device. The wearable unit 86 may also include a transmitter 92 configured to transmit a wireless proximity signal, which may have the form of an infrared (IR) signal, but other forms may also be utilized such as radio frequency (RF or for example, RFID) may be used. The infrared (IR) signal transmission is highly suitable for providing a proximity signal with controlled or limited range which reduces the opportunity for "false" alarms by the system 80, as other transmission forms, such as radiofrequency (RF) signals, may be less controllable in range and also may be more susceptible to signal interference. The transmitter 92 may be mounted on the case 88, and may be positioned in the interior of the case. The transmitter 92 may have a transmission range, and in some implementations the range may measure less than approximately 5 feet, and may measure at least approximately 3 feet.

The wearable unit 86 may also include a power source 94 which is configured to provide power to elements of the wearable unit and may be positioned on the case 88. In some embodiments, the power source 94 may comprise a rechargeable battery, although interchangeable single use batteries may also be utilized. The wearable unit 86 may have a processor 96 which is mounted on the case 88 and is configured to cause the transmitter 92 to transmit the proximity signal. Illustratively, the processor 96 may be configured to cause the transmitter 92 to transmit the proximity signal at a selected interval in between signal transmissions, and the selected interval being preselected or may be selectable by a user of the system 80 via the processor. The processor 96 may be configured to cause the transmitter 92 to transmit the proximity signal with an identification code of the wearable unit to identify the wearable unit (and the being wearing the unit) with which the proximity signal is associated. Each of the wearable units 86 of the system may have a unique identification code. The wearable unit 86 may also include a being movement sensor 98 configured to detect movement of the being associated with the wearable unit. The being movement sensor 98 may be mounted on the case, such as in the interior 90. The being movement sensor 98 may be configured to generate a movement signal when movement of the wearable unit 86 is sensed, and the movement signal may be provided by the wearable movement sensor to the processor 96. In some embodiments, the being movement sensor 98 may include an accelerometer.

The system 80 may further include an object unit 100 which is positionable at the object 84, such as a relatively stationary object. In some implementations, a plurality of the object units 100 may be utilized and may each be positioned at a discrete object. For example, the object unit may be positioned in that area or space of the building for which it is desirable to provide an alert when a being 82 moves into proximity of that area or space.

Each object unit 100 may comprise a housing 104 configured to be mounted on or otherwise physically associated with one of the objects 84. The housing 104 may define a housing interior 106, and may also have structure for mounting the object unit 100 on, or in close physical association with, an object. Each object unit 100 may further comprise a receiver 108 which is configured to receive a wireless proximity signal transmitted by a wearable unit 96. The receiver 108 of the object unit 100 may be configured to produce an alert signal when a wireless signal is received. For example, the receiver 108 may be configured to receive the IR signal transmitted by the transmitter 92 of the wearable unit 86, and may be configured to derive the identification code derived from a wireless proximity signal received by the receiver 108.

Each object unit 100 may also comprise a processor 110 which is configured to receive the identification code associated with the proximity signal received by the receiver 108 to identify the wearable unit, the processor being configured to compare the received identification code with a list of identified identification codes to identify the wearable unit transmitting the proximity signal, the processor being configured to log temporal information associated with the received proximity signal, the temporal information including a time and date of reception of the proximity signal, Each object unit 100 may comprise an alerting assembly 112 configured to provide a presence alert when the receiver receives a wireless proximity signal, and the presence alert may provide an identification of the object unit 100 which produced the proximity alert. In some implementations, the presence alert may include or encode an object identification code to identify the particular object unit with which the presence alert is associated, and each of the object units of the system may have a unique object identification code to enable or facilitate distinctions to be made in the alert or alerts produced by the object unit.

The alerting assembly comprises a perceptible alerting mechanism 114 which may be configured to produce a presence alert which is a perceptible presence alert which is perceptible to a sense of a human. For example, in some illustrative embodiments, the perceptible alerting mechanism 114 may be configured to produce a presence alert which is auditory to be sensed by ears of a human. As a further example, in some embodiments, the alerting mechanism may be configured to produce a presence alert which is visual to be sensed by eyes of a human. As yet a further example, in embodiments, the alerting mechanism may be configured to produce a presence alert which is tactile to be sensed by the skin of a human.

In some embodiments, the alerting mechanism 114 may comprise a remote alerting mechanism 116 which may be configured to produce a remote presence alert signal which is receivable remotely from the object unit 100. The remote alerting mechanism 116 may wirelessly transmit the remote presence alert signal. The remote alerting mechanism 116 may be configured to wirelessly transmit the remote presence alert signal via the Bluetooth low energy (BLE) protocol. The remote presence alert signal transmitted by the alerting mechanism may be received by the information handling device 6, and the remote alert signal may be provided to an application program resident on the information handling device. Implementations of the system 80 may also include a secondary transmitter 118 configured to transmit the remote presence alert signal with the object identification code of the object unit with the remote presence alert signal.

The object unit 100 may also include a power source 120 which is configured to provide power to elements of the object unit 100, and the power source may be positioned on the housing 104.

It will be recognized by those skilled in the art that a remote unit, such as is described with respect to remote unit 50, may be utilized with the system 80.

Figure 6:
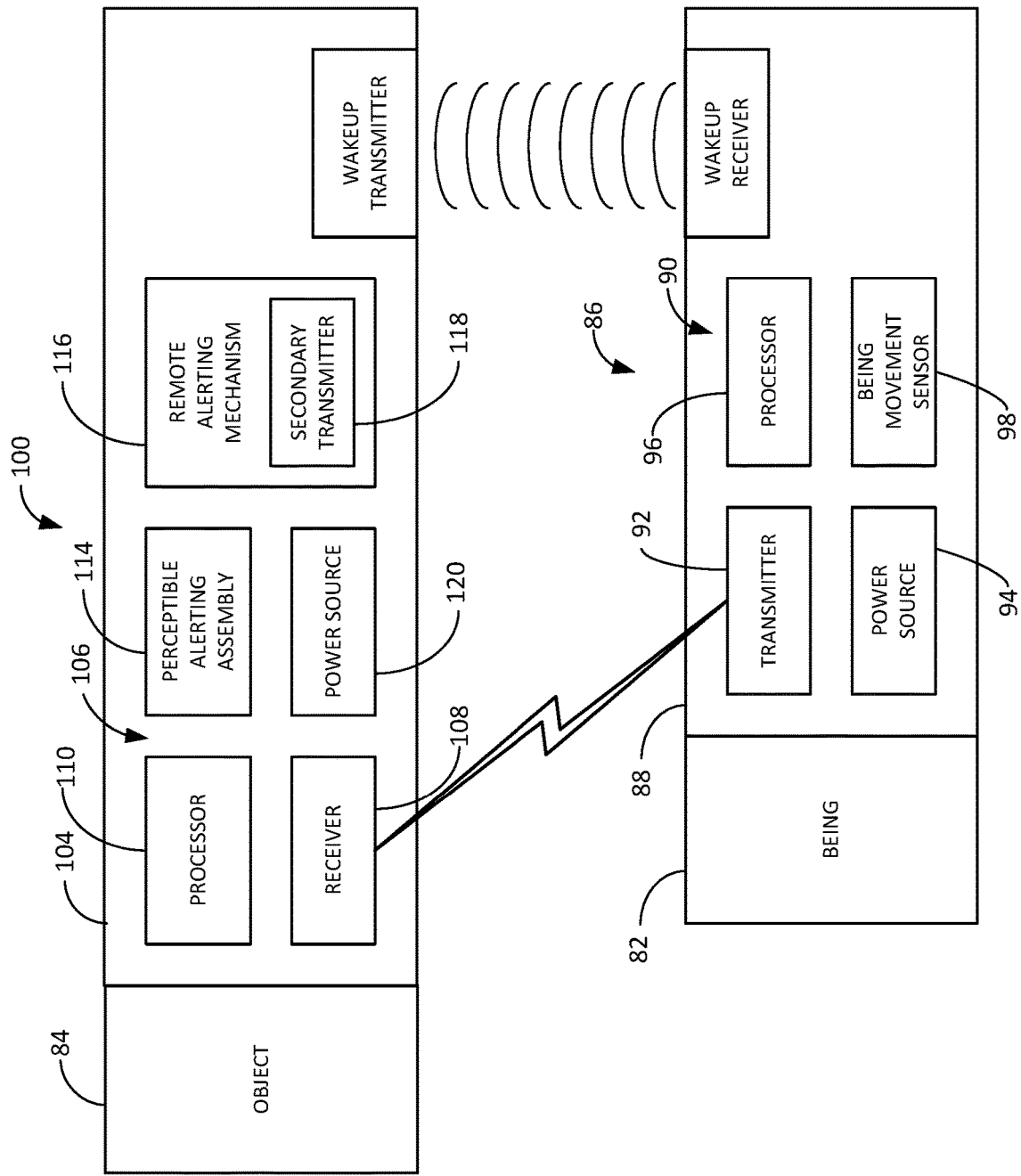
FIG. 6 is a schematic diagram of an implementation of the system including wake-up functionality, according to an illustrative embodiment.

In some embodiments, such as illustratively shown in FIG. 6, the system 10 may have features for optimizing the operation of the system by, minimizing the power consumption of the wearable unit 86 by limiting the operation of the elements of the wearable unit to times when the wearable unit is in proximity to the object unit. In such embodiments, the object unit 100 may include a wakeup transmitter 122 which is configured to wirelessly transmit a wakeup transmission. The wakeup transmitter 122 may continuously transmit the wakeup transmission while the system is operational and independent of the proximity of the units 86, 100 to each other. Illustratively, the wakeup transmitter 122 may be an infrared (IR) transmitter configured to transmit IR energy. In some implementations, the wakeup transmission may be characterized by the transmission lacking any data. The wearable unit 86 may include a wakeup receiver 124 configured to wirelessly receive the wakeup signal from the wakeup transmitter of the object unit 100. The wakeup receiver 124 may be configured to send a wakeup signal to the processor 96 of the wearable unit 86 when the wakeup receiver detects or receives the wakeup transmission from the wakeup transmitter 122. The wakeup receiver 124 may be mounted on the case 88 of the wearable unit. Illustratively, the wakeup receiver 124 may comprise a photo detector, such as a photo diode. The wakeup receiver 124 may be positioned on the case 88 in a manner such that the photo detector is exposed to space exterior of the case, and able to receive energy from the IR transmitter of the object unit 100.

In such embodiments, the wearable unit 86 may have a lower power mode of operation and a higher power mode of operation, and the wearable unit may be configured to change from the lower power mode to the higher power mode upon receiving the wakeup signal from the wakeup receiver. The lower power mode may be characterized by elements of the wearable unit 86 consuming less power than the elements of the wearable unit in the higher power mode. The lower power mode may be further characterized by the processor 96 being in a low power consumption mode. The higher power consumption mode of operation may be characterized by the processor being out of the low power consumption mode. The higher power mode of the wearable unit 86 may be characterized by the processor 86 causing the transmitter 92 of the unit 86 to transmit the proximity signal.

In the operation of embodiments employing the wakeup feature, the wakeup transmitter 122 of the object unit 100 may continuously or substantially continuously transmit the wakeup signal, such as in the form of IR energy, in the space adjacent to the object unit so that when the wearable unit 86 moves into the space adjacent to the object unit, the wakeup receiver 124 of the wearable unit is able to sense or detect the IR energy from the wakeup transmitter. Upon receiving the IR energy from the wakeup transmitter 122, the wakeup receiver 124 may send a wakeup signal to the processor 96 to cause the wearable unit to change from the lower power mode (at which the wearable unit had previously been operating) to a higher power mode in which the transmitter 92 of the wearable unit may transmit the wireless proximity signal which may include the identification code or other data to be received by the receiver 108 of the object unit. Such an implementation may be utilized in place of periodic transmissions of the proximity signal by the transmitter 92, which may significantly reduce power consumption by the wearable unit and the need to replace or recharge the power source 94 of the wearable unit.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for providing an alert that a being is proximate to an object, the system comprising:
    a wearable unit wearable on the body of the being, the wearable unit including a transmitter configured to transmit a wireless proximity signal from the wearable unit; and
    an object unit positionable at the object, the object unit including:
        a receiver configured to receive a said wireless proximity signal transmitted by a said wearable unit, the receiver being configured to produce an alert signal when a said wireless proximity signal is received; and
        an alerting assembly configured to provide a presence alert when the receiver receives a said wireless proximity signal;
        wherein the alerting assembly comprises a perceptible alerting mechanism configured to produce a perceptible presence alert which is perceptible to a sense of a human;
    wherein the object unit additionally comprises a wakeup transmitter configured to wirelessly transmit a wakeup transmission;
    wherein the wearable unit additionally comprises a wakeup receiver configured to wirelessly receive the wakeup signal from the wakeup transmitter; and
    wherein the wearable unit has a lower power mode of operation and a higher power mode of operation, the wearable unit being configured to change from the lower power mode to the higher power mode upon receiving the wakeup signal from the wakeup receiver.

2. The system of claim 1 wherein the wireless proximity signal comprises an infrared (IR) signal.

3. The system of claim 2 wherein the receiver of the object unit is configured to receive the IR signal transmitted by the transmitter of the wearable unit.

4. The system of claim 1 wherein the wearable unit comprises a processor configured to cause the transmitter to transmit the proximity signal.

5. The system of claim 4 wherein the processor is configured to cause the transmitter to transmit the proximity signal at a selected interval in between transmissions of the proximity signal.

6. The system of claim 4 wherein the processor is configured to cause the transmitter to transmit the proximity signal with an identification code of the wearable unit to identify the wearable unit with which the proximity signal is associated, the identification code being unique to the wearable unit on the system.

7. The system of claim 6 wherein the receiver of the object unit is configured to derive the identification code from a said wireless proximity signal received by the receiver.

8. The system of claim 6 wherein the object unit additionally includes a processor configured to receive the identification code associated with the proximity signal received by the receiver to identify the wearable unit.

9. The system of claim 8 wherein the processor is configured to compare the received identification code with a list of identified identification codes to identify the wearable unit transmitting the proximity signal.

10. The system of claim 8 wherein the processor is configured to log temporal information associated with the received proximity signal.

11. The system of claim 9 wherein the alerting mechanism is configured to produce a said presence alert identifying a said object unit producing the proximity alert.

12. The system of claim 9 wherein the alerting mechanism comprises a remote alerting mechanism configured to produce a remote presence alert signal which is receivable remotely from the object unit, the remote alerting mechanism wirelessly being configured to transmit the remote presence alert signal.

13. The system of claim 12 wherein the remote alerting mechanism includes a secondary transmitter configured to transmit the remote presence alert signal.

14. The system of claim 1 wherein the wearable unit comprises a being movement sensor configured to detect movement of the being associated with the wearable unit, the being movement sensor being configured to generate a movement signal when movement of the wearable unit is sensed and provide the movement signal to the processor.

15. The system of claim 1 wherein the wearable unit comprises:
    a case, the transmitter being mounted on the case; and
    a power source configured to provide power to elements of the wearable unit.

16. The system of claim 1 additionally comprising a remote unit configured to provide a perceptible remote alert at a location remote from a said object unit when the remote unit receives a said proximity signal.

17. The system of claim 1 wherein the wakeup transmitter of the object unit is configured to continuously transmit the wakeup transmission.

18. The system of claim 1 wherein the wakeup transmitter of the object unit is an infrared (IR) transmitter configured to transmit IR energy; and wherein the wakeup receiver of the wearable unit comprises a photo detector.

19. The system of claim 1 wherein the wakeup receiver of the wearable unit is configured to send a wakeup signal to a processor of the wearable unit when the wakeup receiver detects the wakeup transmission from the wakeup transmitter.

* * * * *